United States Patent
Treudt et al.

(10) Patent No.: US 11,872,880 B2
(45) Date of Patent: Jan. 16, 2024

(54) METHOD FOR PRODUCING A LIQUID CONTAINER, LIQUID CONTAINER FOR A MOTOR VEHICLE, AND STRUCTURE FOR REDUCING SLOSHING SOUNDS

(71) Applicant: KAUTEX TEXTRON GMBH & CO. KG, Bonn (DE)

(72) Inventors: Volker Treudt, Windeck (DE); Christoph Schwenk, Mendig (DE)

(73) Assignee: Kautex Textron Gmbh & Co. KG, Bonn (DE)

( * ) Notice: Subject to any disclaimer, the term of this patent is extended or adjusted under 35 U.S.C. 154(b) by 0 days.

(21) Appl. No.: 17/566,681

(22) Filed: Dec. 31, 2021

(65) Prior Publication Data
US 2022/0126685 A1 Apr. 28, 2022

Related U.S. Application Data

(62) Division of application No. 16/096,953, filed as application No. PCT/EP2017/058298 on Apr. 6, 2017, now Pat. No. 11,325,464.

(30) Foreign Application Priority Data

Apr. 29, 2016 (DE) .......................... 102016207476.8

(51) Int. Cl.
*B60K 15/077* (2006.01)
*B60K 15/03* (2006.01)
(Continued)

(52) U.S. Cl.
CPC ............ *B60K 15/077* (2013.01); *B29C 49/20* (2013.01); *B60K 15/03177* (2013.01);
(Continued)

(58) Field of Classification Search
CPC ............ B60K 15/077; B60K 15/03177; B60K 2015/03032; B60K 2015/03046;
(Continued)

(56) References Cited

U.S. PATENT DOCUMENTS 4,844,974 A * 7/1989 McCullough, Jr. .... B65D 90/22
428/920
4,974,743 A * 12/1990 Sasaki .................. B60K 15/077
220/88.1
(Continued)

FOREIGN PATENT DOCUMENTS

DE 3943710 C2 9/1989
DE 69002563 T2 8/1993
(Continued)

OTHER PUBLICATIONS

"Office Action received for Chinese Patent Application No. 201780025648.6, dated Mar. 6, 2019", 6 pages (Official copy only).
(Continued)

*Primary Examiner* — Lee A Holly
(74) *Attorney, Agent, or Firm* — Wiley Rein

(57) ABSTRACT

The invention relates to a method for producing a liquid container (28) for a motor vehicle, having the method steps: providing a wall (14), which is provided in order to delimit an interior chamber (26) of the liquid container (28) for receiving a liquid (34); providing a structure (2), which is provided in order to be arranged in order to reduce sloshing noises in the interior chamber (26) of the liquid container (28), wherein the structure (2) comprises a random arrangement of threads (4) cross-linked with each other and wherein a plurality of the threads (4) of the structure (2) are integrally joined, at least in sections, to at least one or more additional
(Continued)

threads (4) of the structure (2), such that a substantially monolithic structure (2) is formed; connecting the structure (2) to the wall (14).

7 Claims, 4 Drawing Sheets

(51) Int. Cl.
  *B29C 49/20* (2006.01)
  *B29K 101/12* (2006.01)
  *B29L 31/00* (2006.01)
(52) U.S. Cl.
  CPC .. *B29C 2049/2008* (2013.01); *B29K 2101/12* (2013.01); *B29L 2031/7172* (2013.01); *B60K 2015/03032* (2013.01); *B60K 2015/03046* (2013.01); *B60K 2015/0775* (2013.01)
(58) Field of Classification Search
  CPC .... B60K 2015/0775; B60K 2015/0346; B29C 49/20; B29C 2049/2008; B29K 2101/12; B29L 2031/7172; B29L 2031/3055
  See application file for complete search history.

(56) References Cited

U.S. PATENT DOCUMENTS

| | | | |
|---|---|---|---|
| 5,000,336 A | | 3/1991 | Gass |
| 5,031,795 A | * | 7/1991 | Kotera ................ B60K 15/077 220/563 |
| 6,408,979 B1 | * | 6/2002 | Forbes ................. G10K 11/16 181/198 |
| 2003/0015537 A1 | | 1/2003 | Konja |

FOREIGN PATENT DOCUMENTS

| | | |
|---|---|---|
| DE | 19650415 A1 | 6/1998 |
| DE | 102012009944 A1 | 11/2012 |
| DE | 102014221823 A1 | 4/2016 |
| EP | 0 413 609 A1 | 2/1991 |
| EP | 0976599 A2 | 2/2000 |
| FR | 2 972 685 A1 | 9/2012 |
| JP | 63-258750 A | 10/1988 |
| JP | 5-139169 A | 6/1993 |
| JP | 7-17160 A | 1/1995 |
| JP | 11-240345 A | 9/1999 |
| JP | 2004-322996 A | 11/2004 |
| JP | 2006 171504 A | 6/2006 |
| JP | 2006273131 A | 10/2006 |
| WO | 2006/126162 A2 | 11/2006 |
| WO | 2017/186471 A1 | 11/2017 |

OTHER PUBLICATIONS

"Office Action received for Japanese Patent Application No. 2018-556380, dated Mar. 11, 2019", 4 pages (Official copy only).
"Decision to Grant received for Korean Patent Application No. 10-2018-7031235, dated Feb. 27, 2019", 4 pages (1 page of English Translation and 2 pages of Official copy).
International Search Report and Written Opinion dated, Jul. 18, 2017, in International Patent Application No. PCT/EP2017/058298, filed Apr. 6, 2017.
International Preliminary Report on Patentability dated, Apr. 30, 2018, in International Patent Application No. PCT/EP2017/058298, filed Apr. 6, 2017.

* cited by examiner

METHOD FOR PRODUCING A LIQUID CONTAINER, LIQUID CONTAINER FOR A MOTOR VEHICLE, AND STRUCTURE FOR REDUCING SLOSHING SOUNDS

RELATED APPLICATIONS

This application is a divisional application of the U.S. patent application Ser. No. 16/096,953, filed Oct. 26, 2018, which is a § 371 National Stage Application of PCT/EP2017/058298, filed Apr. 6, 2017, which claims priority benefit of German Patent Application No. 102016207476.8, filed Apr. 29, 2016, which applications are incorporated entirely by reference herein for all purposes.

FIELD

The invention concerns a method for producing a liquid container for a motor vehicle, a liquid container for a motor vehicle, and a structure for reducing sloshing sounds which is intended to be arranged in a liquid container for a motor vehicle.

BACKGROUND ART

In modern motor vehicles, many different liquids are stored such as for example fuel for powering the engine, urea solution for exhaust gas aftertreatment, or cleaning solution for cleaning the front and rear screens or headlamp glass. These liquids are carried in corresponding tanks or containers in the motor vehicle.

Because of the vehicle movement, the liquids perform wave movements which impact on the inner wall of the respective container and thus generate noises in the vehicle which are known as sloshing sounds. With modern drive systems, these sloshing sounds are no longer masked by the engine noise and may be perceived as disruptive by vehicle occupants. The noise emission of hybrid or electric drives is significantly less than that of a conventional drive with just an internal combustion engine, and is no longer sufficient to cover the sound generated by the liquids carried. But even in vehicles with purely combustion engine drive which are equipped with a start-stop system, the liquid movements are perceptible in the passenger cell directly after stoppage of the vehicle when the engine has been switched off.

To reduce the liquid movement, it is known to arrange baffles inside a tank. Such baffles however must be integrated in complex tank geometries and also must not adversely affect the functionality and accessibility of any moving components arranged inside a tank. The possibilities for arranging baffles inside a tank are therefore very restricted, so that it is not possible to guarantee adequate acoustic protection using baffles.

It is furthermore known to attach so-called "hedgehog" matting to the inner walls of tanks. This comprises a plurality of pins protruding freely into the tank interior and arranged on a mat. The individual pins serve to disrupt the wave movements. The effect of such hedgehog matting is however dependent on the through-flow direction. If the liquid flows through the pin arrangement transversely to the longitudinal extension, the wave movement can be damped. If however the wave fronts meet the end faces of the pins, the latter only slightly influence the liquid movement. Also, hedgehog matting is normally only attached at a few points on the tank inner wall, so that the mat itself can knock against the tank inner wall and thus contribute to the noise excitation. In order to optimize a complete tank system acoustically using hedgehog matting, a very great amount of material is required, which substantially increases the weight of the tank as a whole.

To reduce wave movements and damp sloshing sounds, DE 10 2012 009 944 A1 proposes arranging mats made of a knitted, worked or woven fabric in a liquid container. The damping capacity of these mats is direction-dependent because of the regular structure of the knitted, worked or woven fabric, so that depending on the fluid flow direction, the quality of damping of the liquid movement and the resulting noise excitation varies. Furthermore, threads or small abraded parts may detach from the woven, knitted or worked fabric and adversely affect the functionality of lever-type senders, valves or pumps which may be arranged in a liquid container or tank.

It is also disadvantageous that, according to DE 10 2012 009 944 A1, in order to attach the matting inside the container, additional fixing elements are required on the mat or container. By means of these fixing elements, the mats are connected to the tank only at their edges and can knock or rub against the container wall during operation of the vehicle and thus in turn create sounds. Furthermore, the matting is attached to the tank inner wall after production of the tank housing, so that the possibilities for arranging the matting are restricted. Moreover, the matting made from knitted, worked or woven fabric cannot be manufactured fully automatically, and is therefore costly to produce.

SUMMARY OF THE INVENTION

In this context, the invention is based on the technical problem of creating a production method for a liquid container, a liquid container for a motor vehicle, and a structure for reducing sloshing sounds, which do not have the above-mentioned disadvantages or at least only to a lesser extent, and which can be produced in an economic and simple fashion.

The technical problem outlined above may be solved with, a liquid container according to the independent claims. Advantageous embodiments of the invention arise from the dependent claims and the description which follows.

According to a first aspect, the invention concerns a method for producing a liquid container for a motor vehicle, having the method steps:
  providing a wall which is intended to delimit an interior of the liquid container for receiving a liquid;
  providing a structure which is intended to be arranged in the interior of the liquid container in order to reduce sloshing sounds, wherein
  the structure comprises a random arrangement of interlinked threads, and wherein
  a multiplicity of the threads of the structure are connected at least in portions by substance bonding to at least one or more further threads of the structure, such that a substantially monolithic structure is formed;
  connecting the structure to the wall.

The terms "random arrangement", or "irregular" in the present case mean that the threads of the structure are arranged in no specific order to each other, as would be characteristic for example of a woven, knitted or worked fabric. Rather, the threads of the structure form a chaotic tangle of threads, or are interlinked in clumps in a random spatial arrangement. In other words, the threads are interconnected in the manner of a random spatial mesh structure.

The random arrangement of interlinked threads has the advantage that the damping properties of the structure are independent of the through-flow direction. In this way, a reliable reduction of sloshing sounds can be achieved.

According to the invention, a multiplicity of the threads of the structure are connected at least in portions by substance bonding to at least one or more further threads of the structure, such that a substantially monolithic structure is formed. The term "substantially monolithic" in the present case means that the structure comprises no threads which can be removed separately. The threads of the structure are consequently fixedly integrated in the structure by form fit and/or substance bonding, so that the functionality of valves or lever-type senders which may be arranged in the liquid container is not disrupted by individual threads which have become detached from the structure.

The structure and/or the wall may be made from one or more plastics in one or more layers. The wall may for example comprise one or more layers of HDPE (high-density polyethylene), LDPE (low-density polyethylene) and EVOH (ethylene-vinyl-alcohol copolymer). The structure may substantially be constructed from a plurality of individual plastic threads which may be made from PE (polyethylene) or PP (polypropylene). The plastic threads may also be constructed in multiple layers, wherein for example a core thread may be sheathed with one or more further plastics. Alternatively or additionally, the threads may be formed hollow and hence hose-like, in order to achieve a high stiffness of the structure with simultaneously low weight and material usage.

According to a refinement of the method, each thread of the structure provided is connected by substance bonding to at least one or more further threads of the structure. In this case, the threads form a monolithic structure so that none of the threads can be detached from the structure without destruction.

In order to achieve an economic connection of the structure to the wall without additional connecting or intermediate elements, the step of connecting the structure to the wall may comprise the following method step:
  producing an inseparable connection between the structure and the wall so that the wall and the structure are formed integrally. Accordingly, the structure and the wall form a unit which, after connection, cannot be separated without destruction.

According to a further embodiment of the method, it is provided that the step of connecting the structure to the wall comprises the following method step:
  welding and/or gluing the structure to the wall so that a substance-bonded connection is formed between the structure and the wall, wherein
  during connection to the structure, the wall in particular is in an at least partially plasticized state. Thus in a simple and economic fashion, a reliable connection of the structure to the wall may be achieved.

The substance-bonded connection between the structure and the wall may be achieved by welding individual threads of the structure to the wall. Consequently, the material of the wall and the material of the structure may fuse together. For example, the structure and the wall may comprise plastics which can be welded to each other. The structure and/or the wall may be coated with a plastic which can be welded to a plastic of the respective other component. For example, the structure and/or the wall may comprise DPE, LDPE, PA or PP. Alternatively or additionally, the structure may be glued to the wall.

During connection to the structure, the wall may be in an at least partially plasticized state. For example, after a preceding forming process such as injection molding, blow molding or deep drawing or similar, the wall may still be in a heated state which may be utilized for connection to the structure, in particular welding to the structure. The connection between the wall and the structure may therefore take place in the forming heat of the wall. Alternatively or additionally, the wall may be heated by an additional supply of energy or heat for the step of connection to the structure. Alternatively or additionally, the structure may be heated before connection.

According to a further embodiment of the method, it is provided that the step of connecting the structure to the wall comprises the following method step:
  pressing the structure against the wall so that a form-fit connection is formed between the structure and the wall, wherein
  during connection to the structure, the wall in particular is in an at least partially plasticized state.

During the pressing of the structure against the wall, the material of the wall may at least partially flow around individual threads so that a form-fit connection is created between the structure and the wall. Thus individual thread ends or thread loops of the structure may engage in or protrude into the material of the wall, and counter a relative movement of the structure relative to the wall in the manner of a counter-hook.

The form-fit connection may be supplemented by substance-bonded connection. Accordingly, a casing surface of a thread of the structure may be melted locally and transform by substance bonding into the material of the wall, while a core of the thread remains structurally intact and protrudes into the wall. This may be a thread of a mono-material which merely melts partially, or a thread constructed of two or more layers, the monolayer or multilayer sheathing of which is melted while a core material remains intact. In other words, the structure may penetrate or be pressed into the material of the wall and/or be welded thereto locally.

During the form-fit connection to the structure, the wall may be in an at least partially plasticized state. As already stated, the joining process may be carried out in the forming heat of the wall in order to utilize the heat from preceding process steps. Alternatively or additionally, the wall may be prepared for a form-fit connection to the structure by the supply of energy or heat. Alternatively or additionally, the structure may be heated before connection.

According to a further embodiment of the method, it is provided that the step of connecting the structure to the wall comprises one of the following method steps:
  producing a substantially full-surface connection between the structure and the wall, so that a plurality of randomly arranged connecting points are formed between the structure and the wall and distributed over a connecting region. The full-surface connection may prevent the structure from knocking on or rubbing against the wall during operation of the vehicle. Therefore no additional noise is generated by the structure itself; or
  producing separate or local connecting regions between the wall and the structure.

The structure is preferably an open grid structure. The term "full-surface connection" in this context means that in a connecting region spanned between the structure and the wall, which in its length and width dimensions may substantially correspond to a base or cover surface of the structure, a plurality of local, randomly arranged connecting points are formed between the threads of the structure and the wall and are distributed over the entire connecting region. Because of the random thread arrangement, on connection of wall and structure, a plurality of randomly arranged connecting points, in particular local weld points, may be created between the wall and the structure.

As an alternative to a full-surface connection, it may be provided that separate or local connecting regions are formed between the wall and the structure. This may be provided for example if the geometry of the liquid container or its attachments or surrounding parts restrict the connection of the structure to the wall.

In order to adapt the structure to the geometry of the wall, the structure may be deformed at least in portions for contact against the wall. The shaping of the structure may take place before insertion of the structure in the interior. Thus, firstly, the structure may be formed separately and independently of the wall, and then connected to the wall.

The structure may be heated before shaping and be deformed in the heated state wherein, after cooling, the structure retains the intended shape. The structure may be deformed for example by rolling or pressing. The structure may be preformed in a tool so that the structure has forming elements which are shaped complementarily to forming elements provided on the finished wall. The structure may therefore be formed complementarily to a form of the wall in order to lie flush against the wall.

Preferably, the substance-bonded connections between individual threads of the structure are not adversely affected by the deformation or plastic and/or elastic forming of the structure. In particular, there is no tearing or abrasion of local connecting points between the threads. The substantially monolithic thread structure therefore remains preferably completely intact and is not destroyed by any shaping or pressing processes. This may be achieved by heating the structure before deformation.

The structure may be adapted to the wall of the liquid container during connection to the wall. If the wall is received for example in a molding tool, the structure may be pressed against the wall by means of an actuator and thus at least in portions bear against the wall, following the inner contour of the wall. In this case too, the structure may be heated in order to promote the shaping. The forming of the structure may also be achieved by closing a tool while the structure is held inside the tool, for example on a carrier or joining frame.

Alternatively or additionally, the structure may be formed by pressurization. For this, the structure may be enveloped before pressurization in order to allow deformation of the open thread structure. The enveloping may take place using a film which is removed after forming.

The step of providing the wall may be achieved by blow molding. According to a refinement of the method, the step of providing the wall comprises the following method steps:
    extrusion of a preform which is intended to be formed into
        a wall of the liquid container by blow molding;
    introduction of the preform into a blow-molding tool;
    forming of the wall of the liquid container by pressurization of the preform inside the blow-molding tool.
        According to this embodiment, the step of connecting the structure to the wall comprises the following method step:
    introduction of the structure into the interior, wherein the wall is arranged inside the blow-molding tool during insertion of the structure.

The step of connecting the structure to the wall may therefore be integrated in a device and a method for blow molding. The structure may be connected to the wall inside the blow-molding tool in the forming heat of the blow-molding process.

Inside the blow-molding tool, a substance-bonded and/or form-fit connection may be created between the wall and the structure. The form-fit connection may comprise both local impression of the structure into the wall and also the shaping of the structure for adaptation to the shape of the wall.

The step of connecting the structure to the wall may comprise one of the following method steps:
    arranging the structure on an actuator which is intended
        for inserting the structure into the interior and pressing
        the structure against the wall;
    and/or
    arranging the structure (2) on a joining frame which is
        intended in particular to be arranged between half
        shells of the wall (14) of the liquid container (28).

By means of the actuator, the structure may be positioned in the interior. Furthermore, the actuator may serve for pressing the structure against the wall and for shaping the structure. The actuator may be simultaneously a handling and shaping tool, and therefore promote an efficient process management.

The structure may be held on a joining frame which may comprise both rigid holding elements and actuators. The joining frame may be arranged between two tool halves provided for forming the wall, wherein the tool halves may be movable in the direction of the joining frame. For example, the joining frame may be positioned between two tool halves arranged in an open position. By moving the tool halves into a closed position, the structure held on the joining frame may be connected to the wall.

In the blow-molding process, the preform may be extruded as a circumferentially closed hose. The structure may be introduced into an end opening of the preform by means of the actuator. During the connecting step, the structure and the wall may be pressed together or compressed between the blow-molding tool and the actuator.

Alternatively, the preform may first be extruded as a circumferentially closed hose which is split or separated longitudinally into two halves immediately after extrusion. The two halves of the preform may be introduced into the blow-molding tool separately and independently of each other. The structure may be positioned between the halves of the preform by means of the actuator, moved in the direction of the blow-molding tool and joined and/or welded to the wall.

In both the variants described above, the preform or a respective half of the preform is brought to bear against an inner contour of the blow mold by pressurization, so as to form the intended wall shape of the liquid tank to be produced. If the preform has been separated longitudinally, the two wall halves are connected circumferentially after the structure and any additional components have been arranged in the interior of the liquid container to be produced.

The blow-molding tool is preferably divided at least into two pieces and may be opened and closed for insertion of the preform and removal of the liquid container. The internal pressurization may take place using a blowing mandrel and/or a calibration mandrel.

The step of providing the wall may comprise one of the following method steps:
    injection molding of the wall, wherein the wall comprises
        in particular fixing means for releasable fixing of the
        structure to the wall; or
    extrusion of at least two mat-like preforms which are
        intended to be connected to the wall.

The wall may be made from two half shells which are produced by injection molding.

Fixing means for releasable fixing of the structure to the wall may be provided on the wall. For example, retaining mandrels or forming elements protruding into the interior may be formed on the wall, and serve to receive screws, nuts, sliding blocks or so-called speednuts and for fixing the structure to the wall. The fixing means may be formed integrally with the wall in the injection molding process. For example, the structure may be held on the wall by form fit using clip or snap connections.

The wall may be produced by extrusion of at least two mat-like preforms which are intended to be connected to the wall. This process is described in DE 10 2014 221 823 A1, the disclosure of which is included in the present description to the full extent by reference.

According to a further embodiment of the method, the step of providing the structure comprises at least one of the following method steps:

providing a mat-like semifinished product;
making the structure from the mat-like semifinished product along at least one separating plane;
finishing the structure in the region of the separating plane and/or in the region of covering surfaces, in particular by hot caulking, rolling, sealing or welding.

The material of the structure may be provided as a matting, wherein the structure may constitute a section from such matting. The structure may be finished in the region of the separating plane in order to remove cut thread loops or cut thread ends which may hang loose in the structure due to the separating process. This may be achieved by vibration of the component, blowing out with compressed air, flushing by means of a liquid or mechanical brushing.

Furthermore, alternatively or additionally, the cut surfaces or covering surfaces of the structure may be finished by hot caulking, rolling, compacting or welding. "Covering surfaces" in this context are theoretical surfaces which delimit the geometric dimensions of the open thread structure. Thus the structure may for example be cut as a cube out of the matting. The finishing allows the structure to be compacted locally in the region of the covering surfaces and/or the separating plane(s) in order to increase the dimensional stability of the structure. For example, by compacting the covering surfaces, it may be achieved that a smaller proportion of the hot blowing air penetrates the interior of the structure during a blow-molding process, which could possibly cause detachment of substance-bonded thread connections. Making up and hot caulking of the structure may take place in a combined process step.

The structure may be formed by the disoriented, irregular superimposition of heated plastic threads. The structure may alternatively be produced by interlinking extruded threads, as will be explained below.

Firstly, a plastic granulate is melted into an extrudable homogenous plastic mass. The plastic mass is pressed through a die which has a grid or matrix of mutually spaced openings. The openings may for example be circular.

By passing through the die, the plastic mass is separated into a plurality of mutually spaced individual threads, which run substantially parallel to each other with a preferred vertical extrusion direction. The resulting continuously extruded thread matrix may then be formed into the structure according to the invention, in that individual threads are deflected transversely to the extrusion direction and adhere or weld to adjacent threads.

Here, it may already be sufficient to deflect individual threads from the continuously extruded thread matrix in the form of parallel individual threads, in order to trigger an intermingling or clumping of the thread matrix over the entire matrix cross-section. As soon as the still plastic threads touch each other in the region of their outer casing surfaces, a substance-bonded connection is created in this contact region between the individual threads. The resulting extruded random structure may be cooled in a water bath or similar directly after interlinking of the threads, in order to fix the shape of the mesh structure and the local substance-bonded thread connections.

In order to give the structure a plate-like or mat-like form, the structure may be shaped between rollers or plates. A roller gap may serve both for shaping the threads and for achieving a transverse offset of the threads in order to form the random structure of the parallel extruded thread matrix. For this, the width of the roller gap must be smaller than the width of the parallel extruded thread matrix. Alternatively or additionally, the threads may be extruded in a form which corresponds or approximates to the form of the tank wall, in order to facilitate connection of the structure to the wall.

According to a further aspect, the invention concerns a liquid container for a motor vehicle, with a wall which delimits an interior for receiving liquid, and a structure which is arranged in the interior in order to reduce sloshing sounds. The structure comprises a random arrangement of interlinked threads, wherein a multiplicity of the threads of the structure are connected at least in portions by substance bonding to at least one or more further threads of the structure, such that a substantially monolithic structure is formed.

The random arrangement of mutually interlinked threads has the advantage that an improved damping of sloshing sounds can be achieved. In particular, the damping of sloshing sounds by the structure is independent of the through-flow direction of the structure.

The liquid container may be produced using the method described above. The liquid container may be a fuel tank for a motor vehicle.

The structure may be welded and/or glued and/or connected by form fit to the wall, wherein in particular a plurality of randomly arranged connecting points may be formed between the structure and the wall. In particular, a plurality of local connecting points, such as welds and/or adhesion points, may be formed between the structure and the wall. A full-surface connection may be formed between the structure and the wall. In this way, knocking of the structure against the wall or rubbing of the structure against the wall because of liquid or vehicle movements, may be prevented. The structure and the wall may be formed integrally.

Alternatively or additionally, mechanically acting retaining or connecting elements may be provided for connecting the structure to the wall. In particular, these may be releasable fixing elements.

According to a further embodiment, the structure may be connected by form fit to the wall. Such a form fit may be created firstly in that the outer contour of the structure is adapted to the contour or shape of the wall facing the interior, either by shaping before the step of connection to the wall or shaping which takes place for example during pressing of the structure against the wall. Secondly, a form fit may alternatively or additionally be created in that individual threads or a plurality of threads with their thread ends or thread loops are at least partially surrounded by the material of the wall.

According to one embodiment of the invention, a substance-bonded and/or form-fit connection may be formed between the structure and the wall, wherein additionally screw connections may serve for holding, tensioning or forming the structure.

The structure may be compacted in a region facing the wall so that a higher thread density is present in the region facing the wall than in a region remote from the wall. In particular, the structure may be compacted on two sides by rolling or pressing. Compacting the structure has the advantage that the compacted region has a greater stiffness and stability of form, so that the risk of detachment or destruction of individual thread connections on connection of the wall to the structure is reduced.

According to a final aspect, the invention concerns a structure for reducing sloshing sounds, which is intended to be arranged in a liquid container for a motor vehicle. The structure comprises a random arrangement of interlinked threads, wherein a multiplicity of the threads of the structure are connected at least in portions by substance bonding to at least one or more further threads of the structure, such that a substantially monolithic structure is formed.

The structure is intended to be used in a liquid container according to the invention and/or the method according to the invention.

More than 90%, preferably more than 95%, further preferably more than 98% of the threads of the structure may be connected by substance bonding to one or more further threads of the structure.

The individual threads of the structure, which may be made from plastic, are preferably inherently rigid and not very flexible. Alternatively or additionally to a substance-bonded connection, a thread may be integrated in the structure in that the thread is interwoven with further threads of the structure in several regions, so that it cannot be removed from the structure because of the form fit.

According to a refinement of the structure, each thread of the structure is connected by substance bonding to at least one further or several threads of the structure.

Preferably, the structure has no suction effect for the liquid stored in the container.

According to a refinement, a plurality of randomly arranged connecting points is provided inside the structure, in particular local welds of crossing threads.

Due to the substantially monolithic form of the structure, the structure itself may be configured so as to be rigid, such that a direct connection between the threads of the structure and the wall may be formed without any additional intermediate elements being required. Preferably, in its form intended for connection to the wall, the structure is not very flexible in the manner of a cable or fabric matting. Rather, the structure may be provided as a section, for example cuboid, made from a matting and intended for mounting in the liquid container and held at the end in the manner of a cantilever arm without deforming substantially under its own weight. The structure may therefore be connected to the wall easily and economically. Due to the substantially monolithic form, the structure may in particular be connected to the wall directly and without further intermediate elements.

The structure may comprise threads with different thread thickness or diameter, wherein in particular the threads in a first region have a greater diameter than in a second region. This may be achieved in that cutouts of different diameter are provided in a die for forming the thread structure. In this way, the structure may have regions of different stiffness. For example, a region intended for connecting the structure to the wall of a liquid container may have threads of larger diameter than a region which is facing away from the wall in the final mounted state. Thus the structure may have structural layers of different stiffness and density in the manner of a sandwich material.

Alternatively or additionally, the structure may comprise threads of different materials, wherein in particular the threads in a first region are made from a first material, and the threads in the second region are made from a second material. This may be achieved in that different materials are supplied to a die for forming the threads of the structure. For example, a region which is intended for connecting the structure to the wall of a liquid container may contain threads of a first material, and a region which faces away from the wall in the final mounted state may contain threads of a second material. Thus the structure may have structural layers of different materials in the manner of a sandwich material.

BRIEF DESCRIPTION OF THE DRAWINGS

The invention is described in more detail below with reference to some exemplary embodiments. The drawings indicate diagrammatically.

DETAILED DESCRIPTION OF THE EMBODIMENTS

Figure 1A:
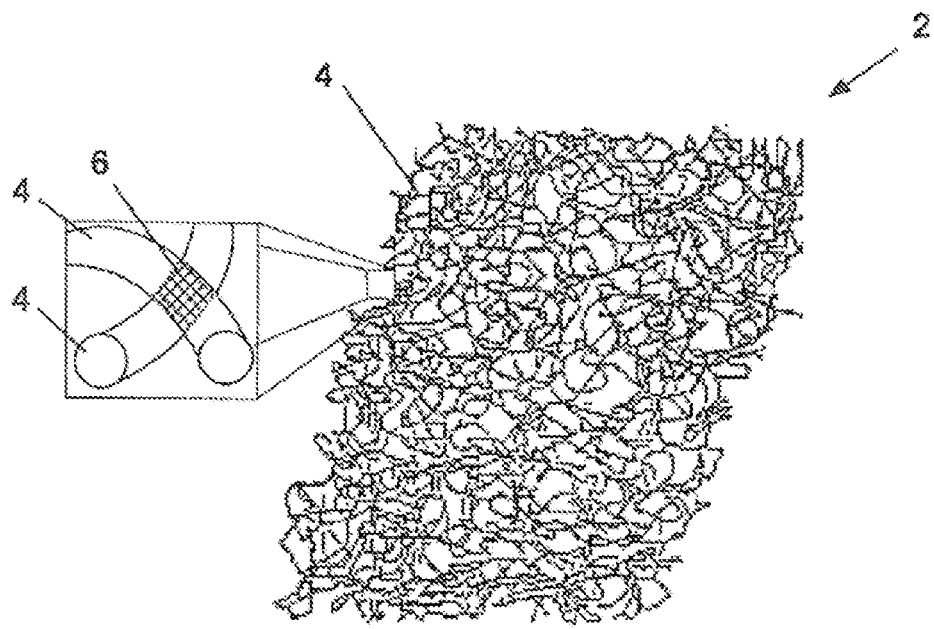
FIG. 1A a structure according to the invention in a perspective view from above.

FIG. 1A shows a structure 2 according to the invention for reducing sloshing sounds, which is intended to be arranged in a liquid container 28 (FIG. 4B) of a motor vehicle. The structure 2 has a random arrangement of interlinked threads 4. A multiplicity of threads 4 of the structure 2 are connected at least in portions by substance bonding to at least one or more further threads 4 of the structure 2 such that a substantially monolithic structure 2 is formed.

The structure 2 contains a plurality of randomly arranged connecting points, in the present case local weld points of crossing threads 4. The substance-bonded connection between the threads 4 is formed in each case by local welding of the threads 4 in the region of their casing surfaces 6, as depicted in exemplary fashion in FIG. 1A. The threads 4 of the structure 2 are made of HDPE.

Figure 1B:
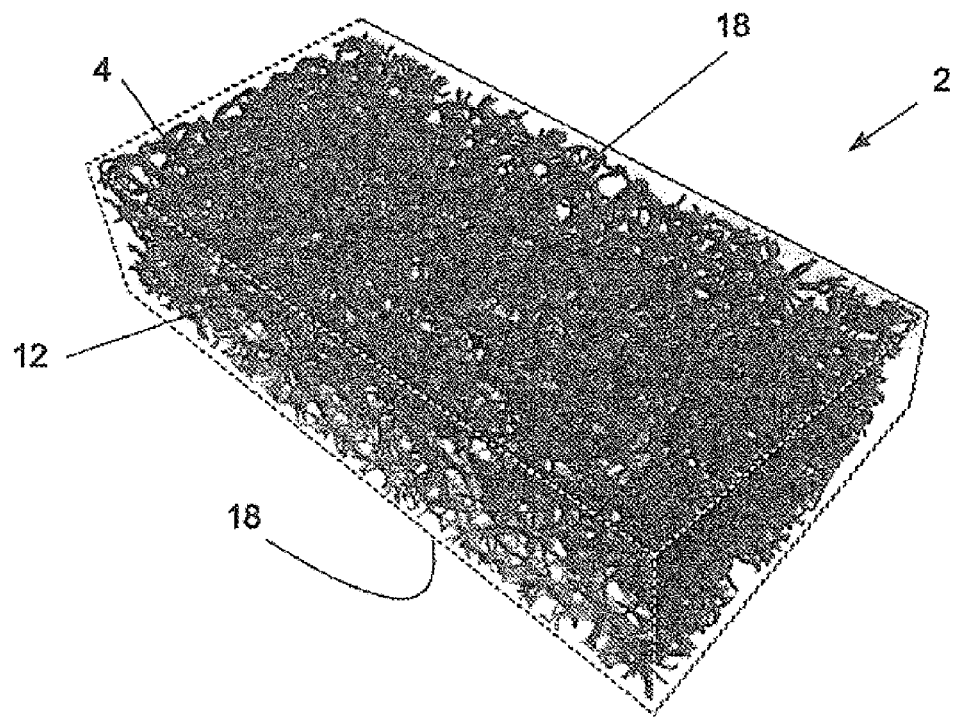
FIG. 1B a further structure according to the invention in a perspective view from above.

FIG. 1B shows a further embodiment of a structure 2 according to the invention. In the case of the structure 2 shown in FIG. 1B, each of the threads 4 of the structure 2 is connected by substance bonding to at least one further thread 4 of the structure 2 so that a monolithic structure 2 is formed. The structure 2 consequently contains no threads 4 which could be detached from the structure 2 without destruction.

As in the structure 2 shown in FIG. 1A, the structure 2 depicted in FIG. 1B has chaotically tangled, interlinked threads 4 which are locally welded together to form a thread mesh. The dotted lines in FIG. 1B indicate the substantially cuboid volume assumed by the structure 2. The structure 2 has a multiplicity of randomly arranged connecting points of crossing threads 4 which are distributed over its entire volume and in the present case are formed as local weld points of the threads 4.

A structure 2 shown in FIG. 1A or 1B may be provided as an endless material in the form of a matting or plate-like product, and may be made up from this for use in a liquid container.

Figure 2A:
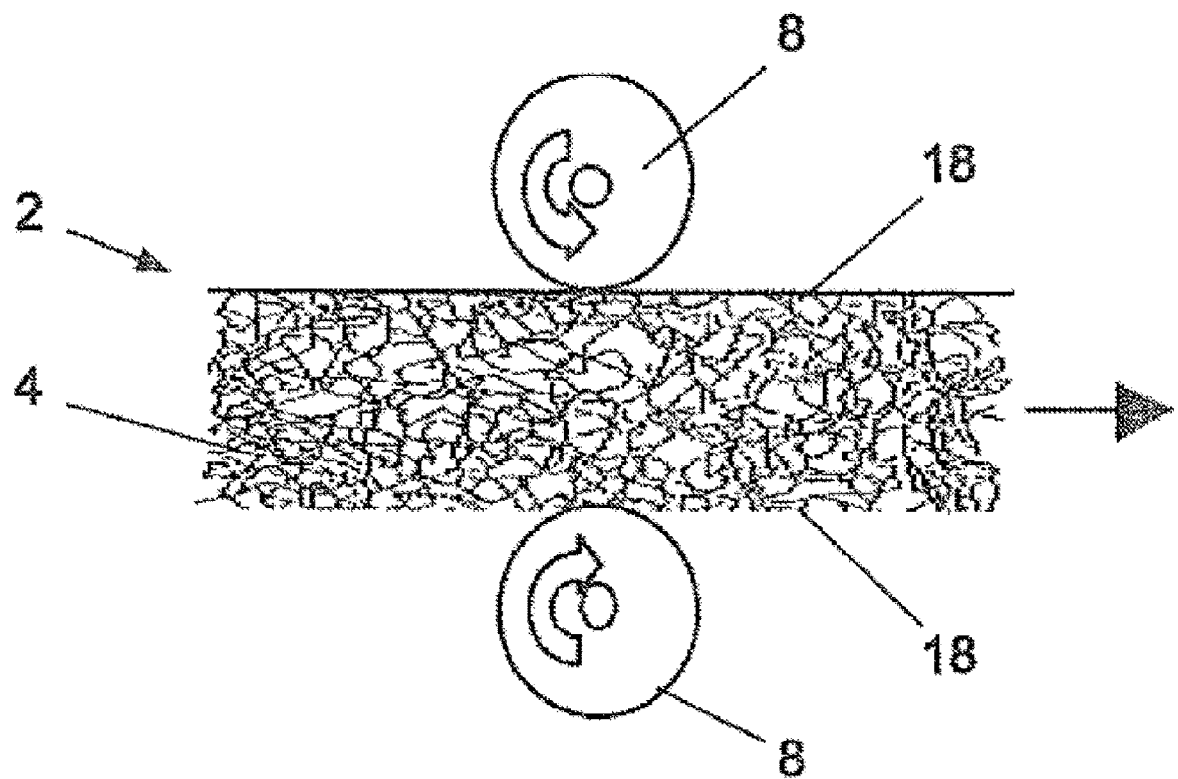
FIG. 2A the rolling of the structure.
Figure 2B:
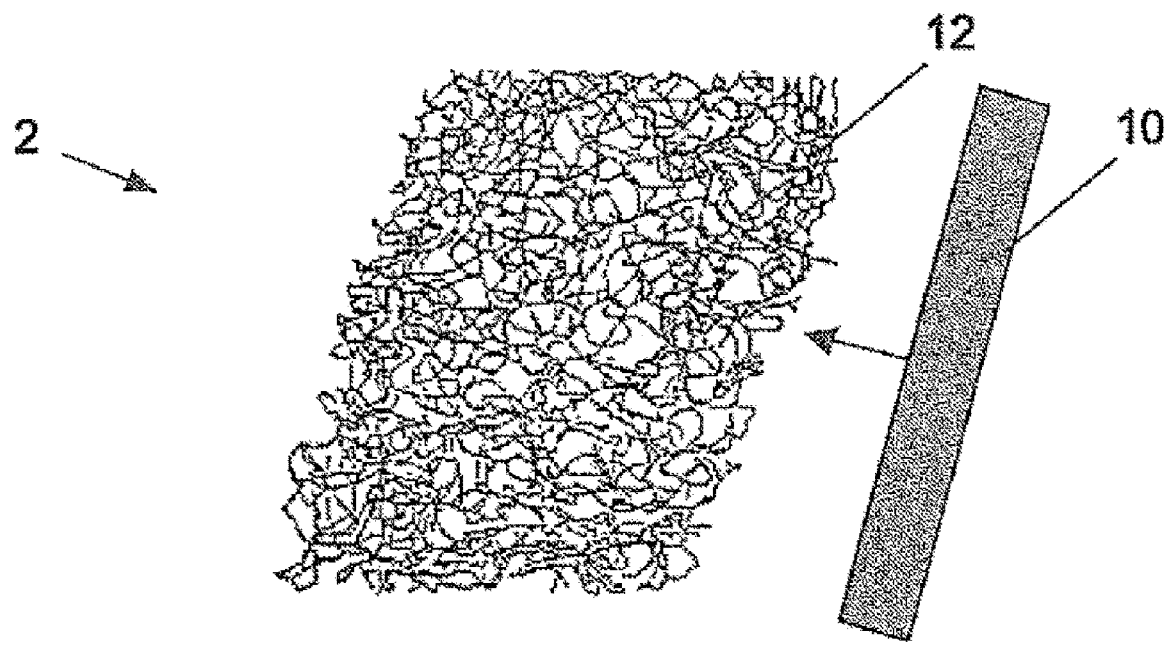
FIG. 2B the hot caulking of a structure.

The structure 2 may be compacted by rollers 8 as shown in FIG. 2A. The arrows in this depiction indicate the movement direction of the rollers and the rolled structure. In this way, the thread density required for the respective application may be set. The structure 2 is rolled in a heated state in which shaping is possible without destroying the substance-bonded connections between the threads 4. The structure 2 is adapted by thermoforming, by means of the rollers 8, to a wall shape of a liquid container 28 and/or is locally compacted in the edge regions assigned to the rollers.

In order to compact or form the structure 2, or to weld individual thread ends to the structure after making up, a device 10 may be provided for hot caulking of the separating or covering surfaces 12 of the structure 2 using pressure and heat.

Figure 3A:
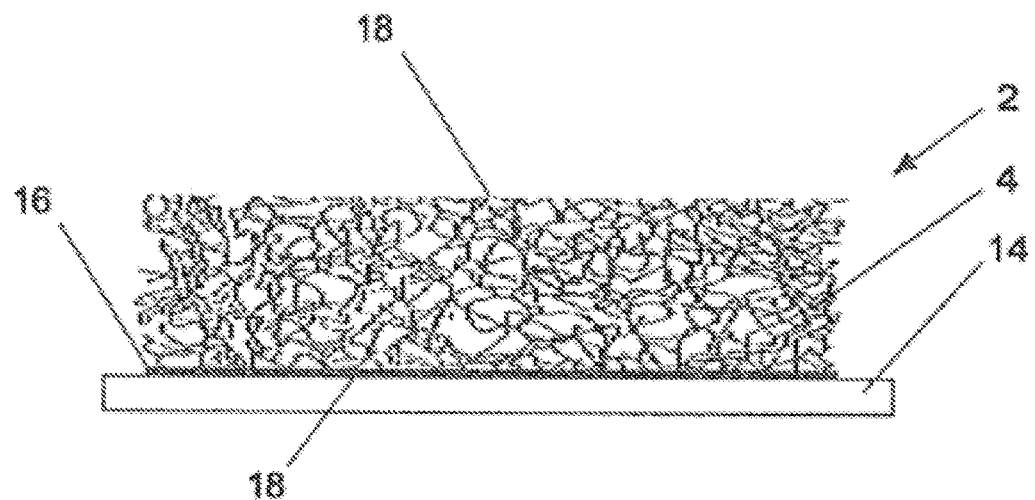
FIG. 3A an extract of a wall of a liquid container with a structure.

FIG. 3A shows an extract of a wall 14 of a liquid container 28 (FIG. 4B) which is welded to a structure 2 in a connecting region 16. The structure 2 is inseparably connected by substance bonding to the wall 14 and therefore formed integrally with the wall 14. The structure 2 has been connected to the wall 14 in the forming heat of the wall 14. A substantially full-surface connection is provided between the structure 2 and the wall 14, so that a plurality of randomly arranged connecting points are formed between the structure 2 and the wall 14, distributed over the connecting region 16. The connecting region 16 may extend over an entire covering surface 18 of a cuboid structure 2 from FIG. 1B. Such a covering surface 18, which may comprise the connecting region 16, may be defined by rolling (FIG. 2A).

Figure 3B:
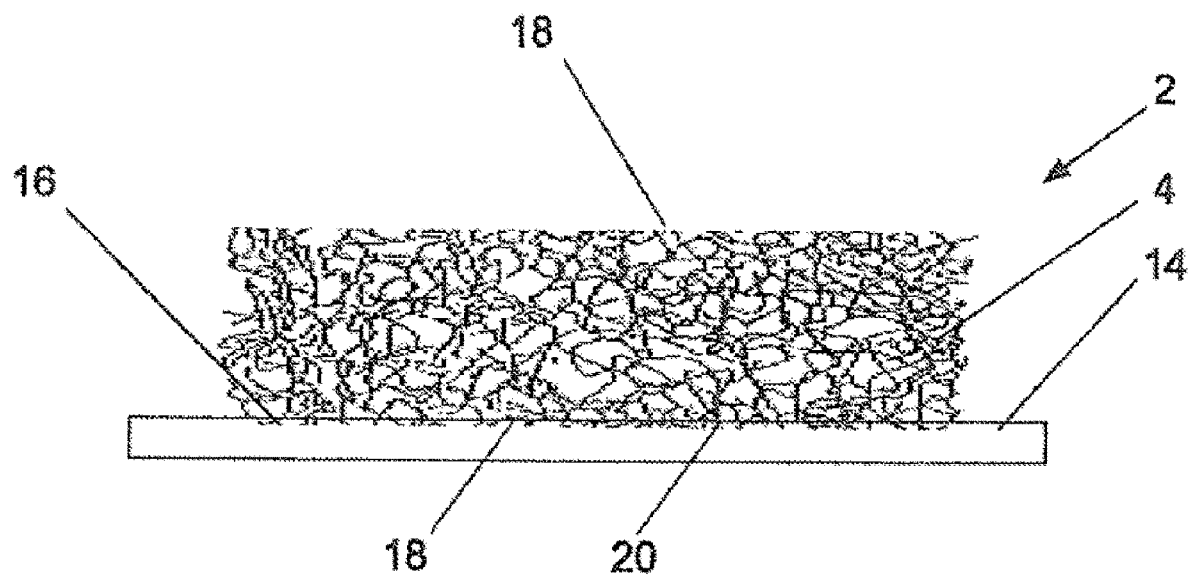
FIG. 3B a further extract of a wall of the liquid container with a structure.

FIG. 3B depicts a form-fit connection between the wall 14 and structure 2, which was also formed in the forming heat of the wall 14. Here, the thread ends and thread loops 20 of the threads 4 protrude into the wall 14 in the connecting region 16 and are at least partially surrounded by the material of the wall 14.

Figure 4A:
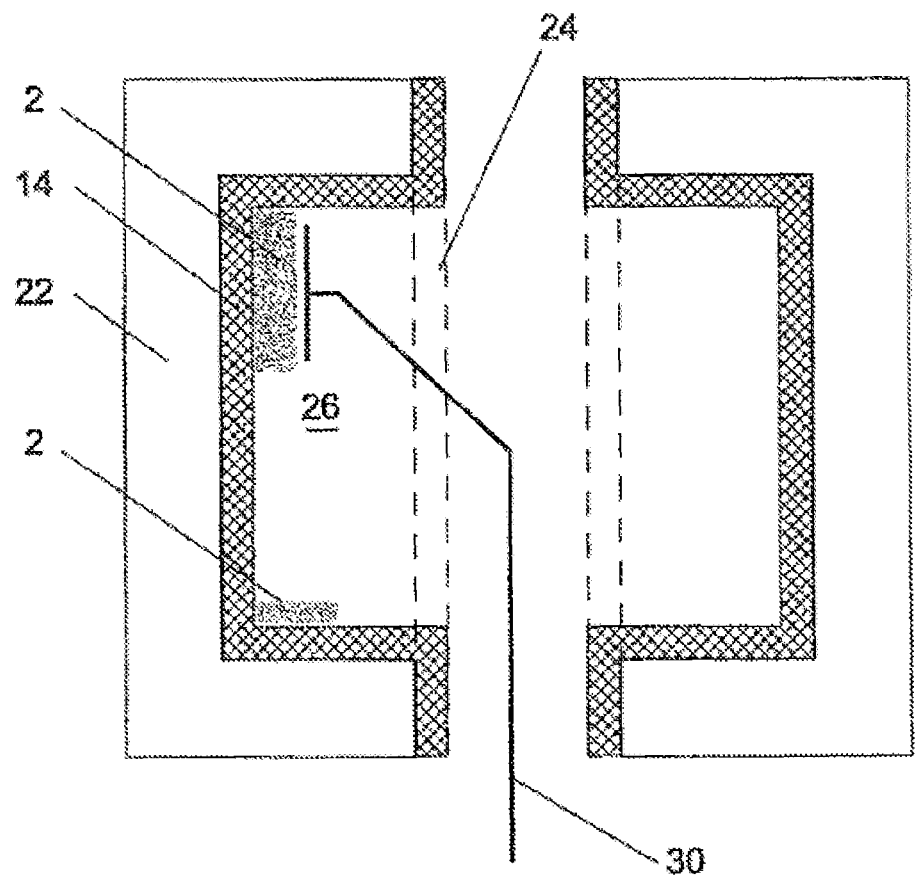
FIG. 4A a device for producing a liquid container.

FIG. 4A shows a blow-molding tool 22 for creating a wall 14 for a liquid container 28. Firstly, a preform 24 extruded in the manner of a hose is introduced into the two-piece blow-molding tool 22. The wall 14 is formed from the preform 24 by internal pressurization by means of a blowing mandrel (not shown). The wall defines an interior 26 of the liquid container 28 (FIG. 4B).

By means of an actuator 30, the structure 2 is introduced into the blow-molding tool at the end and connected to the wall 14 in the forming heat of the wall 14. For this, the structure 2 is pressed against the wall 14. For superficial contact on the wall 14, the structure 2 is at least partially deformed. Individual structural elements 2 may be attached to both vertical and horizontal wall portions.

Figure 4B:
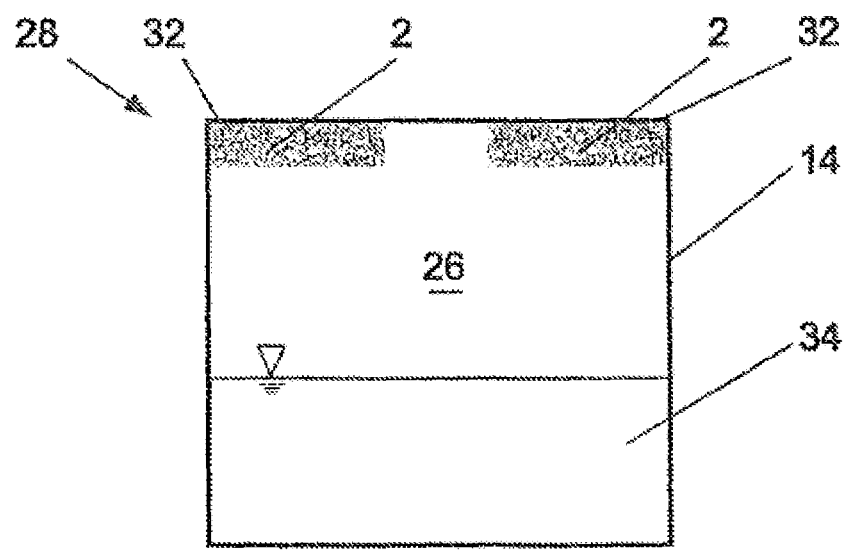
FIG. 4B a liquid container according to the invention.

FIG. 4B shows a fuel tank 28 in which a structure 2 has been arranged in the corner regions 32 in order to damp the sloshing sounds caused by wave movements of the liquid 34.

LIST OF REFERENCE SIGNS

2 Structure
4 Threads
6 Casing surfaces
8 Rollers
10 Hot-caulking device
12 Separating surfaces
14 Wall
16 Connecting region
18 Covering surfaces
20 Thread ends/thread loops
22 Blow-molding tool
24 Preform
26 Interior
28 Fuel tank/liquid container
30 Actuator
32 Corner regions
34 Liquid

The invention claimed is:

1. A liquid container (28) for a motor vehicle, comprising, a wall (14) which delimits an interior (26) for receiving liquid (34), and
a structure (2) which is arranged in the interior (26) in order to reduce sloshing sounds, wherein
the structure (2) comprises a random arrangement of interlinked threads (4), wherein a multiplicity of the threads (4) of the structure (2) are connected at least in portions by substance bonding to at least one or more further threads (4) of the structure (2), such that a substantially monolithic structure is formed; and
the structure (2) is directly welded and/or directly glued to the wall (14).

2. The liquid container as claimed in claim 1, wherein the wall (14) is configured to delimit an interior (26) of the liquid container (28) for receiving a liquid (34) and containing the liquid (34) therein, the wall (14) being formed of one shell or two half-shells.

3. The liquid container as claimed in claim 2, wherein the structure (2) is welded and/or glued directly to the shell or at least one of the half-shells of the wall (14) to provide a substance-bonded connection between the structure (2) and the wall (14).

4. The liquid container as claimed in claim 1, wherein the structure (2) is connected by form fit to the wall (14).

5. The liquid container as claimed in claim 1, wherein the structure (2) is connected to the wall (14) by an inseparable connection between the structure (2) and the wall (14) so that the wall (14) and the structure (2) are formed integrally.

6. A liquid container (28) for a motor vehicle, comprising, a wall (14) which delimits an interior (26) for receiving liquid (34), and
a structure (2) which is arranged in the interior (26) in order to reduce sloshing sounds, wherein
the structure (2) comprises a random arrangement of interlinked threads (4), wherein a multiplicity of the threads (4) of the structure (2) are connected at least in portions by substance bonding to at least one or more further threads (4) of the structure (2), such that a substantially monolithic structure is formed; and
the structure (2) is welded and/or glued to the wall (14), wherein the structure (2) is connected to the wall (14) via a full-surface connection between structure (2) and the wall (14), so that a plurality of randomly arranged connecting points are formed between the structure (2) and the wall (14) and distributed over a connecting region (16); or
wherein structure (2) is connected to the wall (14) via separate or local connecting regions between the wall (14) and the structure (2).

7. A liquid container (28) for a motor vehicle, comprising, a wall (14) which delimits an interior (26) for receiving liquid (34), and a structure (2) which is arranged in the interior (26) in order to reduce sloshing sounds, wherein the structure (2) comprises a random arrangement of interlinked threads (4), wherein a multiplicity of the threads (4) of the structure (2) are connected at least in portions by substance bonding to at least one or more further threads (4) of the structure (2), such that a substantially monolithic structure is formed; and the structure (2) is welded and/or glued to the wall (14), wherein the structure (2) is deformed at least in portions for bearing against the wall (14).

\* \* \* \* \*